US006782242B1

(12) United States Patent
Koleda et al.

(10) Patent No.: US 6,782,242 B1
(45) Date of Patent: Aug. 24, 2004

(54) SLIDE ASSEMBLY FOR A COMMUNICATION UNIT

(75) Inventors: Eugen Koleda, Herlev (DK); Antti Ronkko, Espoo (FI); Kari Hiltunen, Helsinki (FI); Ilpo Kauhaniemi, Vantaa (FI)

(73) Assignee: Nokia Mobile Phones Ltd., Espoo (FI)

( * ) Notice: Subject to any disclaimer, the term of this patent is extended or adjusted under 35 U.S.C. 154(b) by 543 days.

(21) Appl. No.: 09/633,168

(22) Filed: Aug. 4, 2000

(30) Foreign Application Priority Data

Aug. 6, 1999 (GB) .............................................. 9918672

(51) Int. Cl.[7] .............................. H04B 1/38; H04M 1/00
(52) U.S. Cl. .................. 455/90.3; 455/90.2; 455/550.1; 455/575.4; 379/433.12
(58) Field of Search ................................ 455/90.2, 550, 455/575.1, 90.3, 550.1, 575.4; 379/433.12

(56) References Cited

U.S. PATENT DOCUMENTS

| 4,200,003 A | | 4/1980 | Miller | |
|---|---|---|---|---|
| 4,809,867 A | | 3/1989 | Choi | |
| 4,845,772 A | | 7/1989 | Metroka et al. | |
| 5,151,946 A | * | 9/1992 | Martensson | ............... 455/575.4 |
| 5,257,681 A | | 11/1993 | Shtarkman et al. | |
| 5,461,672 A | * | 10/1995 | Enokido et al. | ........ 379/433.02 |
| 5,497,506 A | * | 3/1996 | Takeyasu | .................. 455/575.8 |
| 5,697,070 A | * | 12/1997 | Liebler | ...................... 455/575.1 |
| 5,711,610 A | | 1/1998 | Deck | |
| 5,736,798 A | | 4/1998 | O'Brien et al. | |

(List continued on next page.)

FOREIGN PATENT DOCUMENTS

| EP | 0 414 365 A2 | 2/1991 |
|---|---|---|
| EP | 0763904 A1 | 3/1997 |
| EP | 0 763 904 A1 | 3/1997 |
| EP | 0 792 055 | 8/1997 |
| GB | 235606 | 12/1923 |
| GB | 2 013 413 | 8/1979 |
| GB | 2310560 A | 8/1997 |
| GB | 2310561 A | 8/1997 |
| GB | 2310562 A | 8/1997 |
| JP | 10009329 | 1/1998 |
| WO | WO9209163 | 5/1992 |
| WO | W0 98/09414 | 3/1998 |

OTHER PUBLICATIONS

Vooi–kia et al, atomatic sliding mechanism for portable electronic product, particularly for a sliding front cover of a mobile phone, Jan. 2, 2003, US20003/0003962 A1.*

Eromaki, portalbe electronic device, Oct. 18, 2001, US 2001/0031644 A1.*

Shin, slide type mobile phone using slide moulde, Sep. 6, 2002, US 20020137476A1.*

International Design Bulletin DM/039675 (Nov. 15, 1996).

International Design Bulletin DM/039951 (Apr. 23, 1997).

*Primary Examiner*—Vivian Chin
*Assistant Examiner*—Yuwen Pan
(74) *Attorney, Agent, or Firm*—Antonelli, Terry, Stout & Kraus, LLP

(57) ABSTRACT

A communication unit has a housing part provided with a component for entering information and a slide assembly. The housing part is provided with a set of tracks along which the slide assembly is moveable relative to the housing part. The slide assembly or the housing part includes a component for moving the slide assembly along the tracks on the housing part. This component could be a wire spring, a motor or a gear-provided spring box that moves the slide assembly. The communication unit also has a component for decreasing the friction on the sliding surfaces in a communication unit having a slide. This component could be linear bearings positioned between the moving parts or internally lubricated materials used on the sliding surfaces.

14 Claims, 8 Drawing Sheets

U.S. PATENT DOCUMENTS

| | | |
|---|---|---|
| 5,867,370 A | 2/1999 | Masuda |
| 6,081,595 A | 6/2000 | Picaud |
| 6,101,402 A * | 8/2000 | Bartha et al. ............. 455/569.1 |
| 6,208,874 B1 * | 3/2001 | Rudisill et al. ........... 455/575.4 |
| 6,243,595 B1 * | 6/2001 | Lee et al. ................... 455/566 |
| 6,370,362 B1 * | 4/2002 | Hansen et al. ............. 455/90.1 |
| 6,409,817 B1 | 6/2002 | Stephens .................... 106/601 |
| 6,429,817 B1 * | 8/2002 | Creigh et al. ............... 343/702 |
| 6,463,262 B1 * | 10/2002 | Johnson et al. ............ 455/90.1 |
| 2002/0137476 A1 | 9/2002 | Shin |
| 2003/0003966 A1 | 1/2003 | Ranta |

* cited by examiner

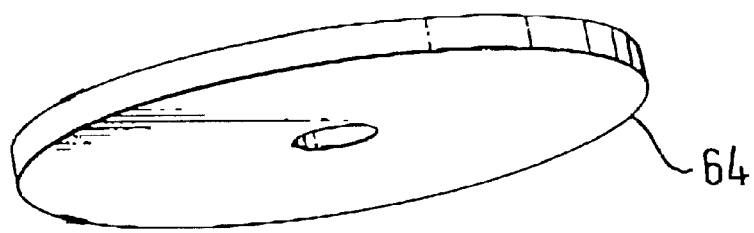
FIG. 11
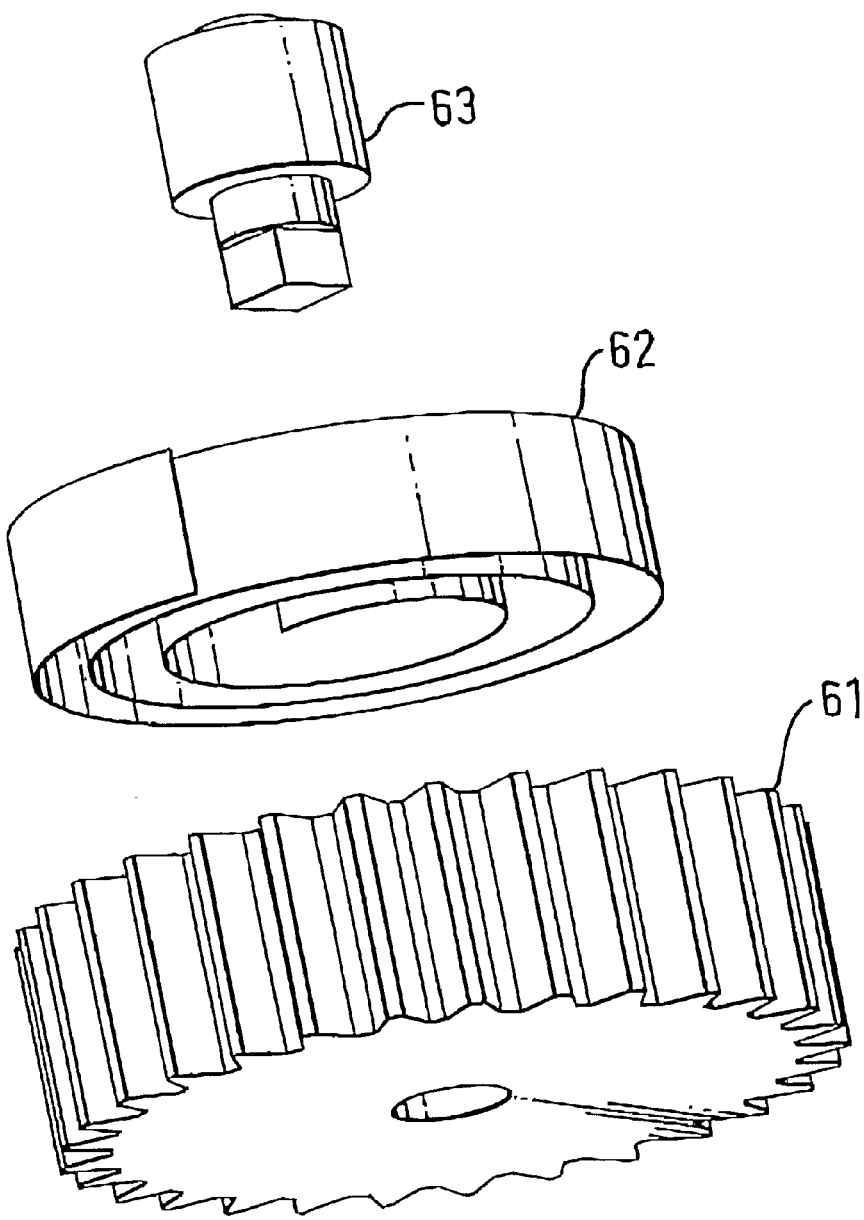

SLIDE ASSEMBLY FOR A COMMUNICATION UNIT

BACKGROUND OF THE INVENTION

The invention relates to a communication unit having a housing part provided with means for entering information, and a slide cover that is slideable relative to the housing part. In one position the slide cover least partly covers the means for entering information, while said means are freely accessible in another position of the slide cover.

Both sliding covers and pivotal flip covers are widely used to protect the keypad of communication devices against unintended use and against dirt from the environment.

U.S. Pat. No. 4,845,772 describes a phone having a pivotal flip cover that disables the keys when the flip cover is closed. GB Patent No. 2.235.606 discloses a phone having a slide cover carrying a microphone. International design bulletins DM/039951 and DM/039675 show two phones having detachable slides.

Magneto-rheological fluids and electro-logical fluids used as motion controllers in dampers or shock absorbers are well known in applications like automobile clutches, doors or lids. U.S. Pat. No. 4,200,003 shows a rotary viscous damper using a magnetic fluid as the damping medium. In this case the fluid is used to control the rotation motion of a rotor. In U.S. Pat. No. 5,257,681 there is shown a segmented slim blade, where a magnetic field responsive fluid is used for motion control. Japanese patent publication JP-10009329 shows a spring box motion controller with the additional refinement of a completely flat version. An electro-viscous fluid is used for controlling the damping of the rotation of the rotary shaft. In U.S. Pat. No. 5,736,798 a big magnetically controlled rotational damper is shown, where magnets can be moved closer to the fluid for adjustable braking action in exercise machines.

SUMMARY OF THE INVENTION

An object of the invention is to provide a communication unit having a slide assembly with means for the slide assembly to be movable along a set of tracks on a housing part of the communication unit, where the slide assembly in an open position allows improved access to the information input means and still provides a good mechanical connection between the slide and the main body of the unit.

According to the invention this is obtained by a communication unit having a housing part provided with a set of converging tracks along which a slide assembly is slideable relative to the housing part. The slide assembly includes a cover part and a spring. The slide cover is moved by the spring, which presses two slide wings of the slide assembly together. According to the preferred embodiment a left slide wing is fastened to the slide cover part, while a right slide wing is flexibly attached to the left wing to be able to glide inside the slide cover part and follow the conical shape of the housing part. In the tracks on the housing part and in the slide assembly wings are bearings, linear bearings, where each linear bearing consists of two guide ways and a set of caged balls (manufactured by e.g. Schneeberger, Switzerland or INA, Germany) between the guide ways.

Preferably the spring is biased in the locked position of the slide. When a release mechanism is released, the slide assembly is moved by the biased spring.

According to another embodiment of the invention the objective is obtained by a communication unit having a housing part provided with a set of tracks along which a slide assembly is slideable relative to the housing part. The housing part is in this embodiment provided with a motor for moving the movable slide assembly along the tracks.

According to a third embodiment of the invention the objective is obtained by a communication unit having a housing part provided with a set of tracks along which a slide assembly is slideable relative to the housing part. In this embodiment a spring box is mounted in the housing part, which is filled with a magneto-rheological fluid, where a gearwheel connected to said spring box moves the slide assembly. The slide assembly include two magnets, which affects the fluid in the spring box causing a damping or/and an accelerating effect on the slide assembly. A first magnet is placed so it is near the spring box in the closed position of the slide cover part, and a second magnet is placed so it is near the spring box in the open position of the slide cover part. The spring box housing may be built with polymer composites to make it lighter. According to an alternative embodiment the spring box could be mounted on the slide assembly, while the two magnets could be mounted on the housing part.

Another object of the invention is to provide a communication unit having a slide assembly with means for the slide assembly to be movable along a set of tracks on a housing part of the communication unit. The slide assembly allows, in an open position, improved access to the information input means and still provides a good mechanical connection between the slide and the main body of the unit. The slide assembly includes means for reducing the friction, which occurs when the slide assembly moves between its two end positions, the open position and the closed position.

According to an embodiment of the invention this object is obtained by a communication unit having a housing part provided with a set of tracks along which a slide assembly is slideable relative to the housing part, and the slide assembly includes a cover part and two slide assembly wings. The means for reducing the friction are linear bearings, which are located in the tracks on each side of the housing part and in the corresponding tracks on the slide assembly wings. Each linear bearing includes two guide ways and a set of caged balls between the guide ways.

According to another embodiment of the invention the means for decreasing the friction is an internally lubricated polycarbonate on the sliding surfaces on both the housing part and the slide assembly.

It is finally an object of the invention to provide a method for producing a slide assembly for a communication unit with means for decreasing the friction between the sliding surfaces in the communication unit.

According to a preferred embodiment of the invention, this object is obtained by having linear bearings, which are located in the tracks on each side of the housing part and in the corresponding tracks on the slide assembly wings. Each linear bearing includes two guide ways and a set of caged balls between the guide ways.

According to an embodiment of the invention this object is obtained by a two shot moulding method where the slide assembly is produced in two steps. With a first shot injection moulding step the main part of the housing part and the slide assembly are produced by using an ABS/PC blend, and in a second injection moulding step the sliding surfaces are produced by using an internally lubricated polycarbonate.

An alternative embodiment of the invention is to form the internally lubricated polycarbonate as a film or a plate, and place this on the sliding surfaces. The sliding surface is then produced in the first injection moulding step.

BRIEF DESCRIPTION OF THE DRAWING

The invention will be explained more fully below, by way of example, in connection with preferred embodiments and with reference to the drawing, in which:

FIG. 11 shows the spring box in FIG. 10 from another angle.

DETAILED DESCRIPTION OF EMBODIMENTS

Figure 1:
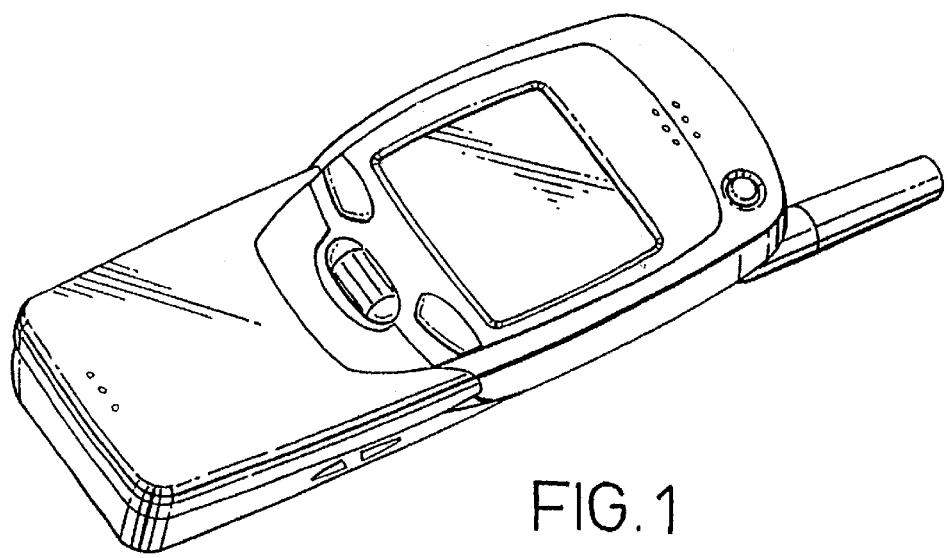
FIG. 1 in perspective shows a preferred embodiment of communication unit according to the invention.
Figure 2:
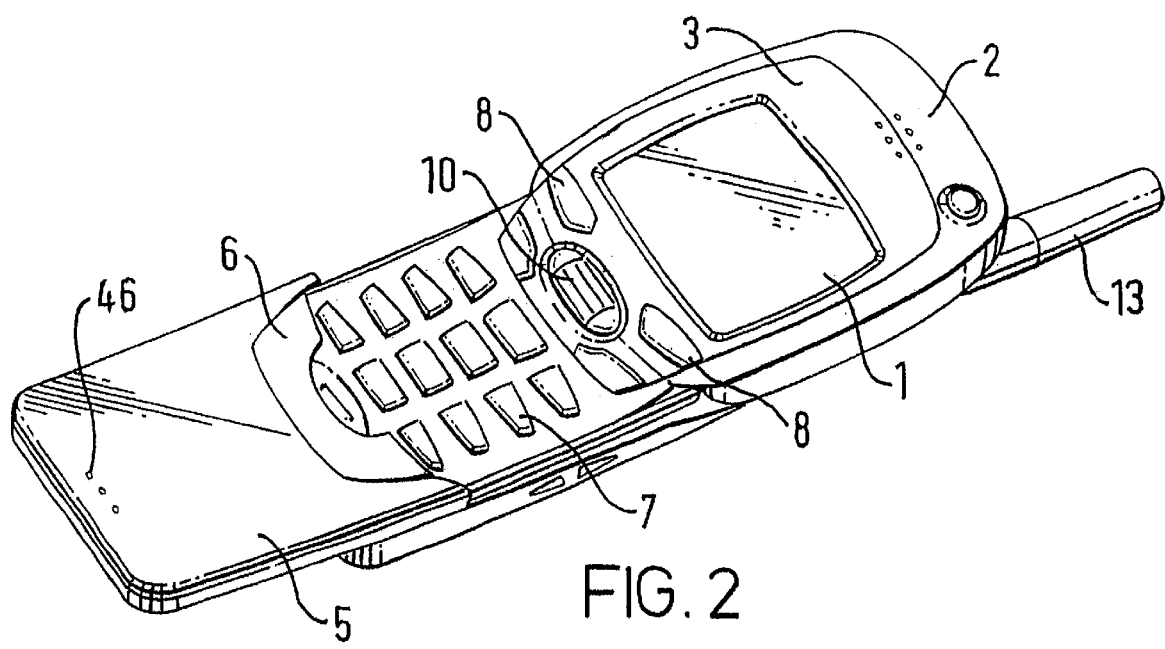
FIG. 2 shows the communication unit shown in FIG. 1 with the slide in the open position.
Figure 4:
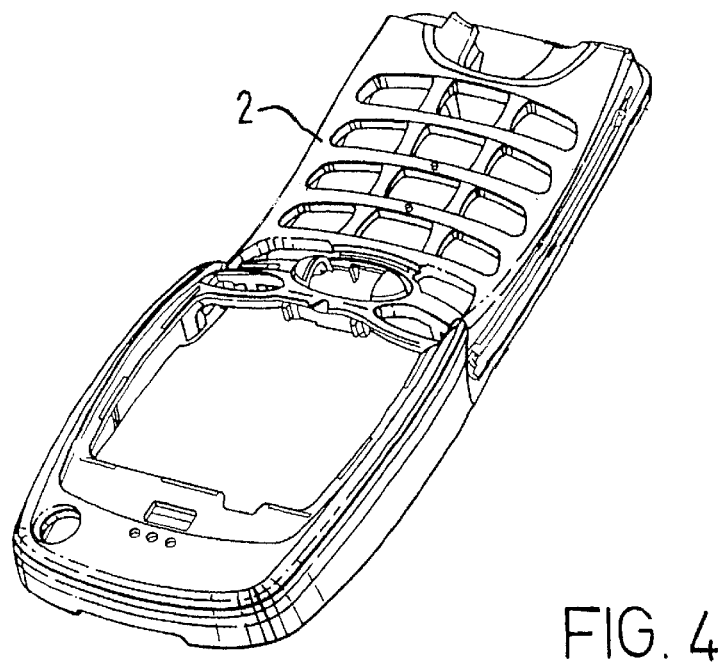
FIG. 4 shows the front cover of the unit shown in FIGS. 1 and 2.

According to a first aspect the communication unit according to the invention will be described with reference to a hand portable phone, preferably a cellular phone. A preferred embodiment of this phone is shown in FIGS. 1 and 2. The phone is shown with the slide in the closed position and in the open position in FIG. 1 and FIG. 2, respectively. As will be seen, the phone is provided with a front cover 2 having a window frame 3 encircling the protection window of the display assembly 1. Front cover 2 is also shown in FIG. 4. It will furthermore be seen how the phone is provided with a slide cover 5 snapped onto a slide frame 6 sliding in slide tracks 31 (see FIG. 5) in the front cover 2 along a keypad area 7 and in extension thereof. The phone preferably also is provided with function keys 8, a navigation key 10, and an antenna 13.

Figure 3:
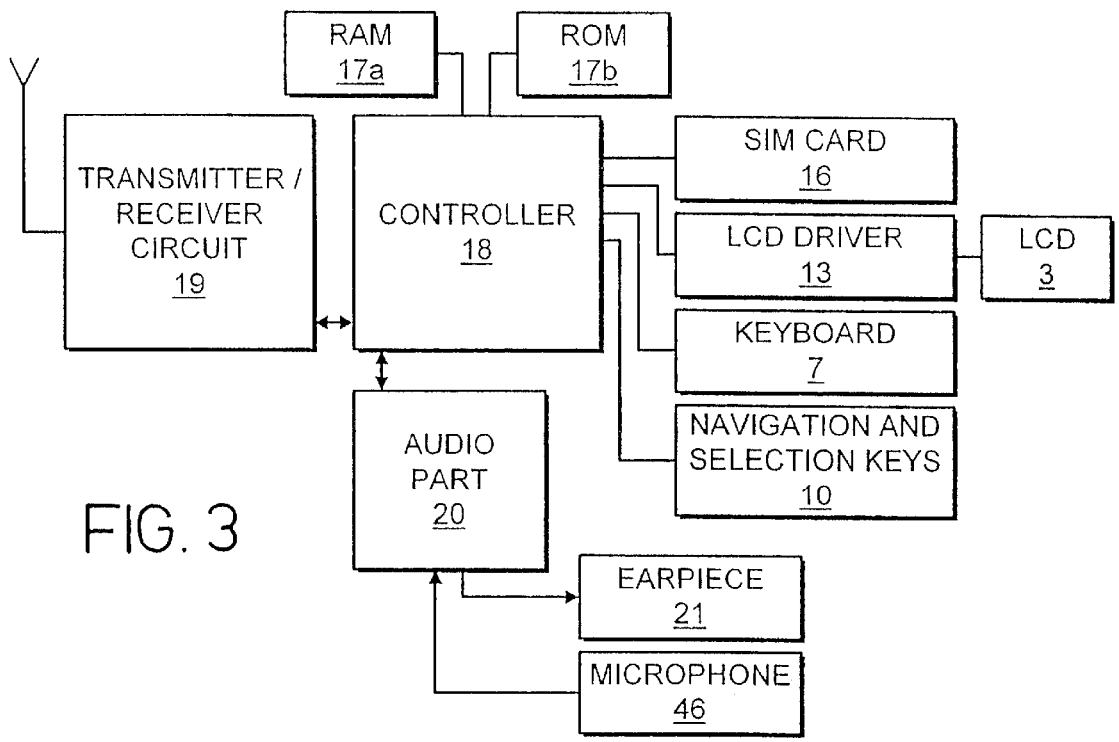
FIG. 3 schematically shows the essential parts of a telephone for communication with a cellular network.

Referring also to FIG. 3, a microphone 46 receives the user's speech, and the analog signals formed thereby are A/D converted in an A/D converter (not shown) before the speech is encoded in an audio part 20. The encoded speech signal is transferred to a controller 18 (physical layer processor), which e.g. supports the GSM terminal software. The controller 18 also forms an interface to the peripheral units of the apparatus, including RAM and ROM memories 17a and 17b, a SIM card 16, LCD driver 13 which connects to the LCD display 1, navigation and selection keys 10, and the keypad 7 (as well as data, power supply, etc.). The controller 18 communicates with the transmitter/receiver circuit 19. The audio part 20 speech-decodes the signal, which is transferred from the controller 18 to the earpiece 21 via a D/A converter (not shown).

FIG. 3 schematically shows the most important parts of a preferred embodiment of the phone, said parts being essential to the understanding of the invention. The preferred embodiment of the phone of the invention is adapted for use in connection with the GSM network, but, of course, the invention may also be applied in connection with other phone networks. It could be cellular networks, various forms of cordless phone systems or in dual band phones accessing sets of these systems/networks.

The controller 18 is connected to the user interface. Thus, it is the controller 18, which monitors the activity in the phone and controls the display 1 in response thereto.

Therefore, it is the controller 18, which detects the occurrence of a state change event and changes the state of the phone and thus the display text. The user may cause a state change event when he activates the keypad 7, including the function key 8 and the navigation key 10, and these types of events are called entry events or user events. However, the network communicating with the phone may also cause a state change event. These type of events and other events beyond the user's control are called non-user events. Non-user events comprise status change during call set-up, change in battery voltage, change in antenna conditions, message on reception of SMS, etc.

Figure 5:
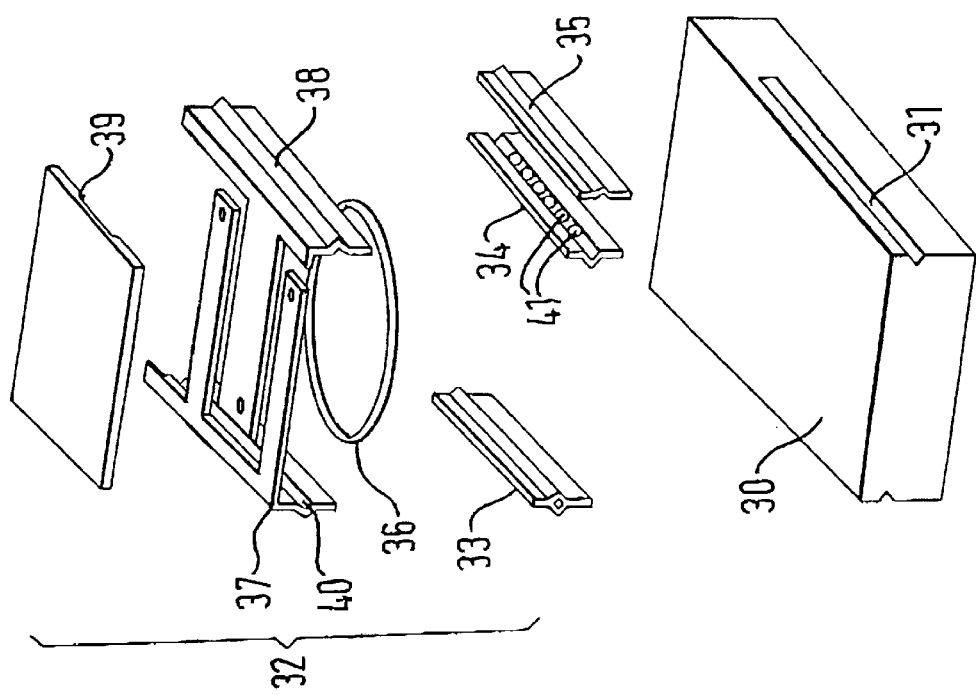
FIG. 5 shows the slide assembly and the conical housing of the unit, with a spring for connecting the two slide wings of the slide assembly.

FIG. 5 shows a preferred embodiment of the invention, where a housing part 30 has a wider portion nearest the display 1 and a narrower portion nearest the bottom end of the unit. The housing part 30 is provided with means, such as a keypad 7, for entering information (best shown in FIG. 2). Said housing part 30 also includes a set of converging tracks, one track 31 on each long side of the housing part. Along these converging tracks 31 slide assembly 32 is moveable, said slide assembly includes a cover part 39, which at least partly covers said means 7 for entering information in one position of said slide assembly 32. The slide assembly 32 also includes a pair of slide wings 37 and 38, that are loosely connected to each other with a wire spring 36. The left slide wing 37 is fastened to the slide cover 39, while the right slide wing 38 is only fastened to the left slide wing through the wire spring 36. This enables the slide wings to closely follow the shape of the housing part 30. The movement of the slide assembly 32 along the housing part 30 is performed by the wire spring 36, which presses the slide wings 37 and 38 together and strives to move the slide assembly towards the narrower end of the housing part 30. The movement starts when a slide release mechanism is initiated by pressing a push button, whereafter the wire spring 36 starts to move the slide cover into the open position where the keypad 7 may be accessed. The right slide wing 38 is able to glide inside the slide cover 39 during the movement to closely follow the converging tracks along the housing part 30.

It is also shown in FIG. 5, a linear bearing 33, which is located in each of the converging tracks 31 on the housing part 30 and in a corresponding set of tracks 40 on the slide wings 37 and 38. The linear bearing 33 aims to decrease the friction when the slide assembly 32 moves between the open position and the closed position. The linear bearing 33 includes two guide ways 34 and 35, and a set of caged balls 41 between said guide ways 34 and 35.

Figure 6:
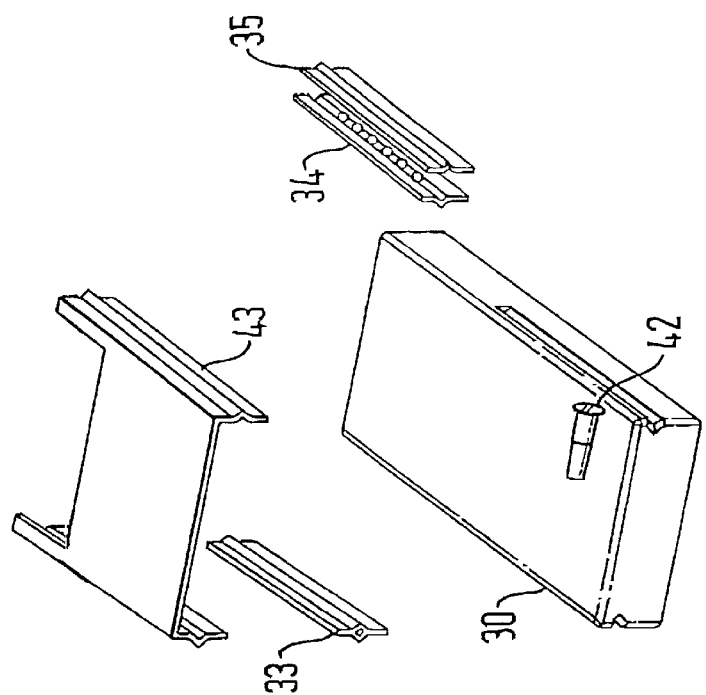
FIG. 6 shows the slide assembly and the housing part of the unit, with a motor mounted on the housing.

FIG. 6 shows a housing part 30, whereon a gear motor 42 is mounted to move a slide assembly 43 between an open position (information could be entered) and a closed position (the keypad is partly covered). The slide assembly 43 is made in one piece, compared with the slide assembly 32 shown in FIG. 5. To decrease the friction, which occurs then the slide assembly 43 moves between the open position and the closed position, linear bearings 33 are located in a set of tracks on the housing part 30 and in a corresponding set of tracks on the slide assembly 43. The gear motor 42 could have a small rubber wheel on its shaft to move the slide assembly 43 from an open position to a closed position, and vice versa. Other solutions to move the slide assembly along the tracks could naturally be used.

Figure 7:
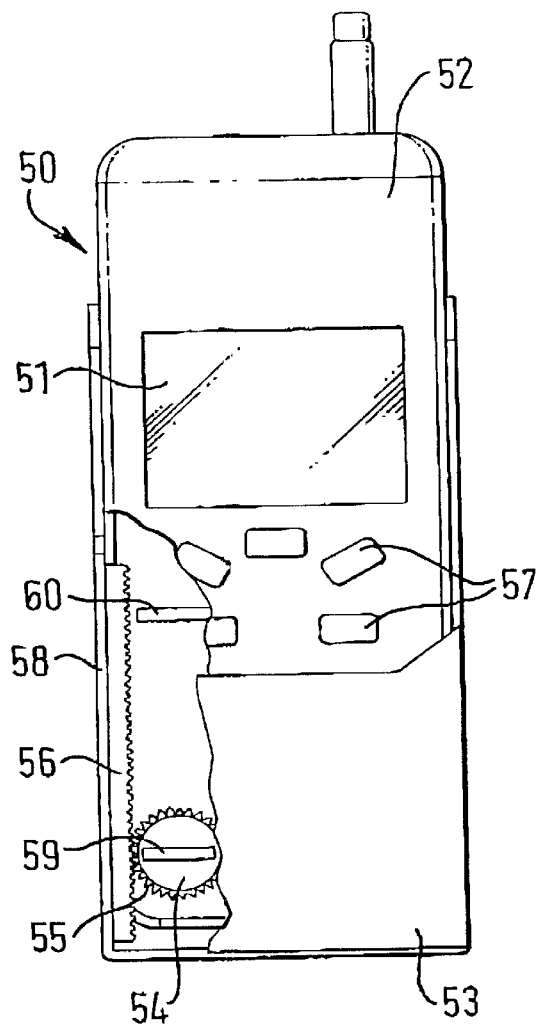
FIG. 7 shows the communication unit with a spring box and the slide in closed position.
Figure 8:
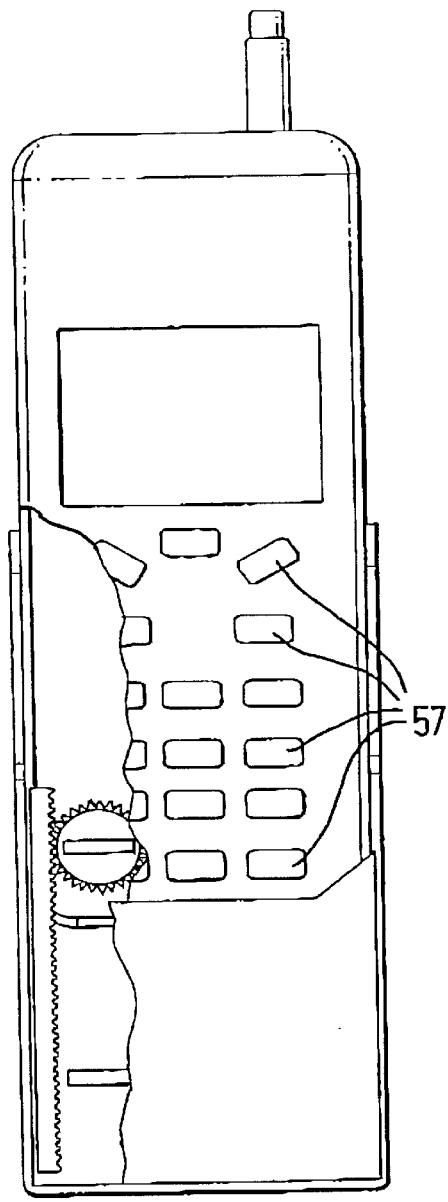
FIG. 8 shows the communication unit shown in FIG. 7 with the slide in open position.
Figure 9:
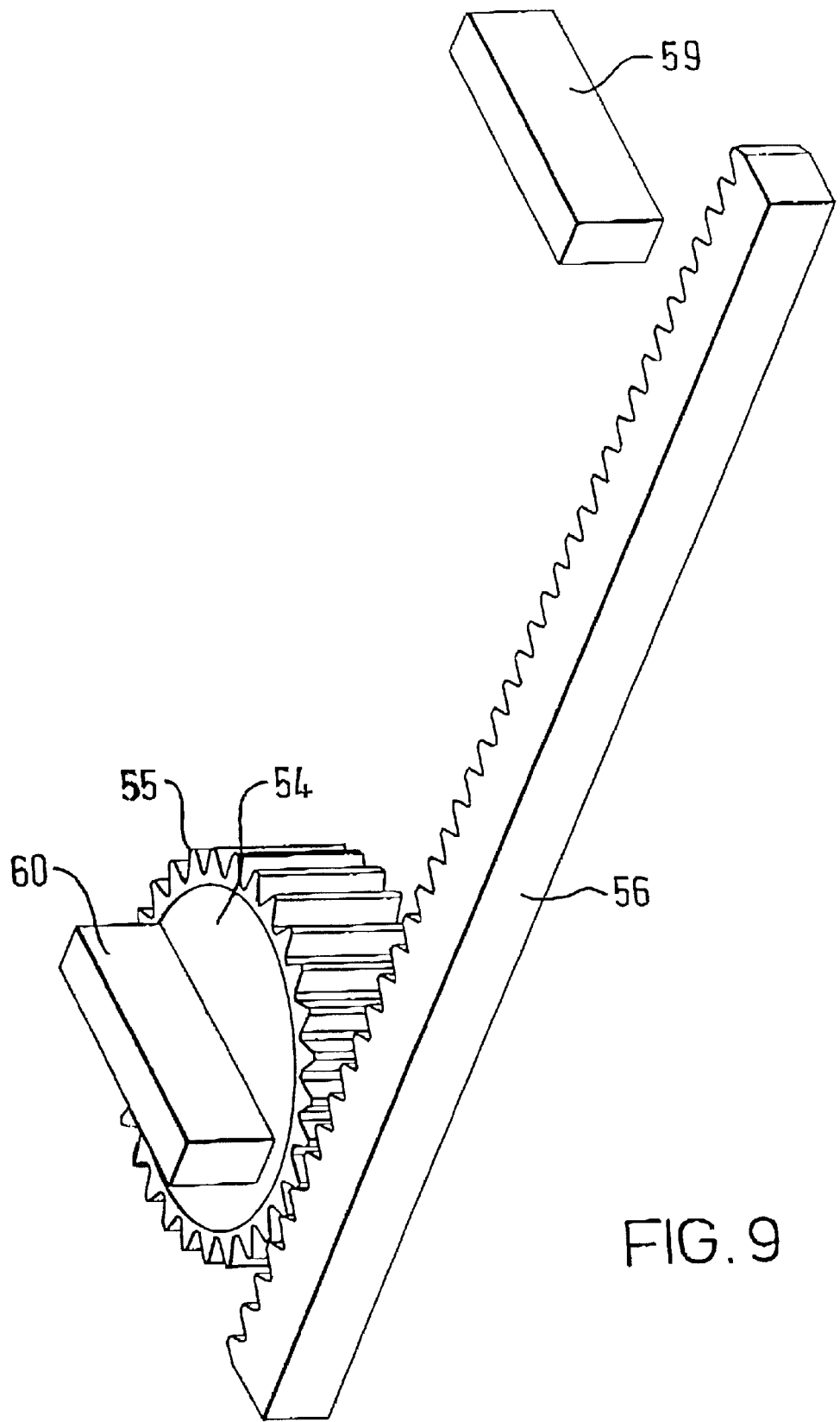
FIG. 9 show the spring box, a rack and two magnets according to one embodiment of the invention.

In FIGS. 7 and 8 a communication unit 50 is shown provided with a display unit 51 and a front cover 52. It is furthermore shown that the communication unit is provided with a slide cover 53, which can be moved between a closed and an open position. In FIG. 7 the slide cover 53 is in a closed position, while it is in an open position in FIG. 8. The slide cover 53, which is sliding along slide tracks (not shown in FIG. 7 or 8), covers a keypad area 57 used for entering information into the communication unit. Also shown in FIGS. 7, 8 and 9 is a spring box 54 mounted in a housing part cover by the front cover 52. The spring box 54 is filled with a magneto-rheological fluid and provided with cogs 55, which interact with a cog provided rack 56. Rack 56 is mounted on the slide cover 53 or on the slide frame 58. Two permanent magnets 59 and 60 are mounted on the backside (the side of the slide cover 53, which is closest to the keypad 57) of the slide cover 53. The magnet 59 is placed so that in the closed position of the slide cover shown in FIG. 7 it is near the spring box 54. The other magnet 60 is placed so that in the open position of the slide cover 53 shown in FIG. 8 it is near the spring box 54. The magnets 59 and 60 increase the viscosity of the fluid inside the spring box 54 when the spring box 54 approaches the magnets and causes a damping of the motion of the slide cover 53. Maqnets 59 and 60 finally lock the slide cover 53 in the respective end position. When the slide begins opening or closing the motion of the slide cover 53 is slow due to the magnets, and after the first magnet is bypassed the motion accelerates because the viscosity of the fluid decreases inside the spring box 54. When the motion approaches the end position of the opening or closing, the viscosity of the fluid increases inside the spring box 54 due to the other magnet. This gives an elegant braking effect, and finally the spring box 54 locks the slide cover 53 into the open position or the closed position.

The spring box with the two magnets are in other words used as an opener and as a motion controller. The viscosity of the magneto-rheological fluid in the spring can be adjusted using magnetic fields with different strengths. This makes it possible to change the characteristics of the fluids in the spring box during the motion if it includes magnets with different strength. If the viscosity of the fluid is low, the spring is a powerful opener and when the viscosity of the fluid is high the spring acts as a brake or a damper. In cases where the viscosity is very high, the spring acts as a locking device.

According an alternative embodiment of the invention the spring box 54 could be mounted on the slide cover 53, while the magnets 59 and 60 are mounted in the housing part of the communication unit. The function of the parts is the same as described above.

Figure 10:
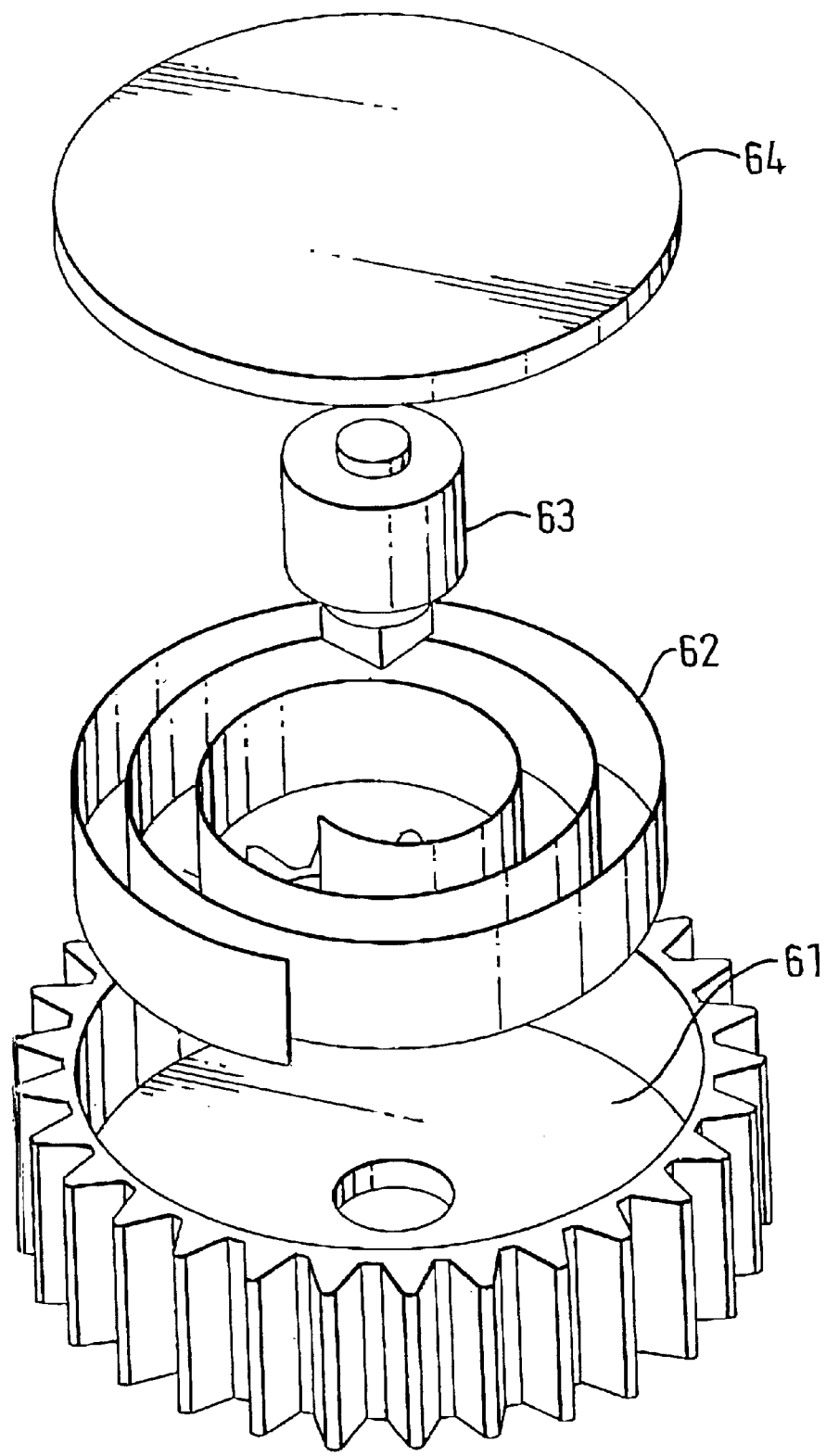
FIG. 10 shows the spring box in an exploded view.

FIG. 10 is an exploded view of the spring box 53 showing that the spring box includes a spring box housing 61, a spring 62, a shaft 63 and a lid 64. The same exploded view of the spring box is shown in FIG. 11, but from a different angle. The spring box housing 61 can be made of polymer composites. The shaft 63 is attached to the housing part having a bearing to permit the rotation of the spring box 54. In the alternative embodiment the shaft 63 is attached to the slide cover 53.

To decrease the friction between the sliding surfaces on a slide assembly and a housing part, an internally lubricated polycarbonate is used on the sliding surfaces. The internally lubricated polycarbonate (PC) is applied onto the sliding surfaces by moulding. In a first shot injection moulding step the main part of the housing part and the slide assembly is produced by using an ABS/PC blends and in a second injection moulding step the sliding surfaces are produced by using an internally lubricated polycarbonate. The internally lubricated materials could also be produced into a thin film or plate, and then these polymer pieces are placed permanently on the sliding surfaces, which have been made in the first injection moulding step is this case.

The friction coefficient of the internally lubricated polycarbonates can be adjusted by using different internal lubrication agents. These could be agents like polytetrafluorethane, silicone or a combination of both. Other materials having the same effect, without affecting other desired characteristics, could also be used.

Using internally lubricated polymers on the sliding surfaces also has some assembly advantages. It is often necessary to grease the sliding surfaces as a separate work operation, but if the assembly already has the friction-decreasing means in itself this work operation could be left out.

The invention is not limited to embodiments described above and illustrated in the drawings, but can be varied within the scope of the appended claims.

An Example Showing the Angle Between the Converging Tracks

Figure 12:
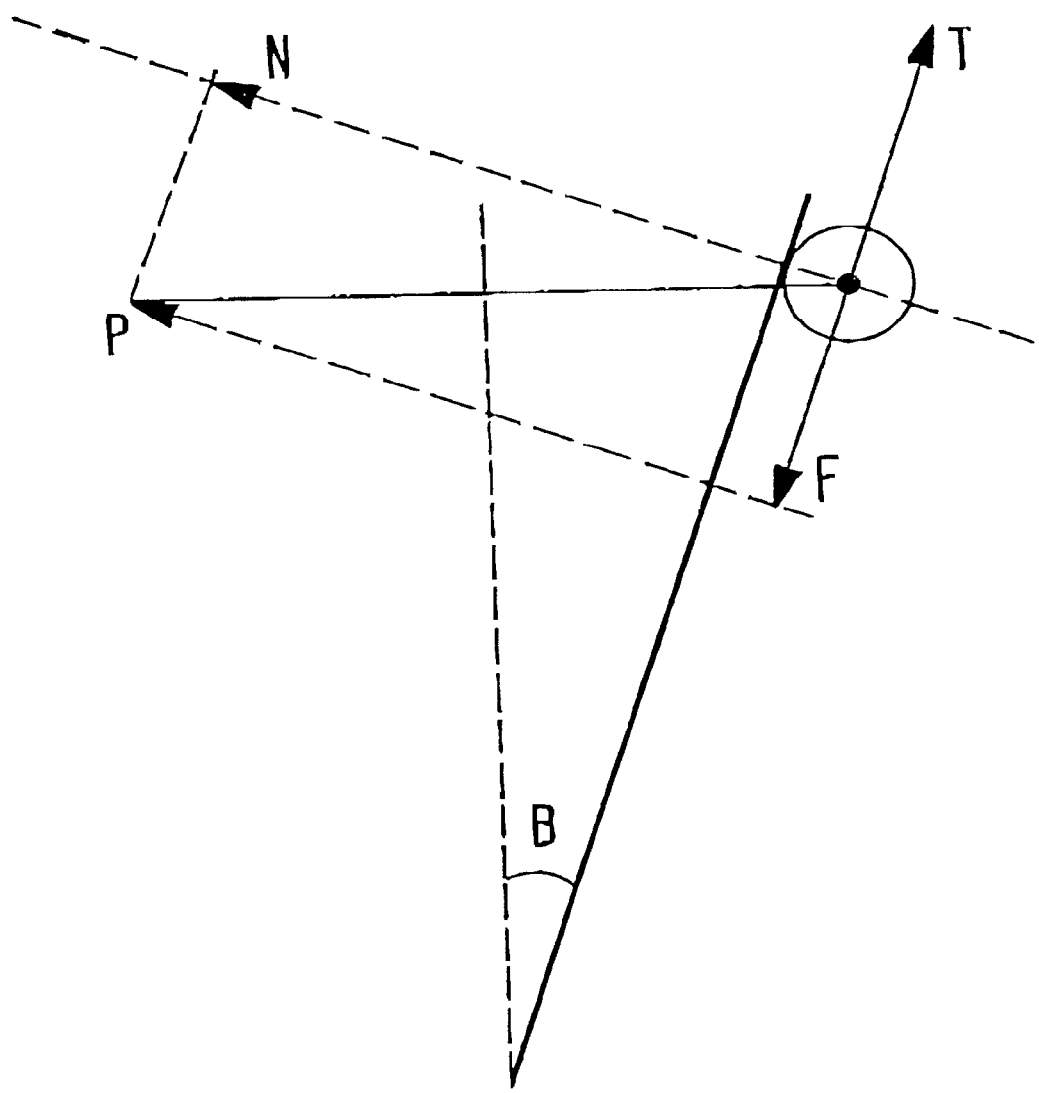
FIG. 12 shows the angle at one of the converging tracks

In FIG. 12 is shown an angle β between one of the converging tracks and the principal direction of the housing part and the forces acting when the slide assembly is transported between its end positions. According to the example below it would take the slide assembly 0.1624 s to travel between the two end positions if the force of the spring is 1N and the angle β=1.5°. This assumes that the angle between the other converging track and the principal direction of the housing part is the same.

Relevant Equations $$\frac{N}{P} = \cos\beta \Rightarrow N = P\cos\beta$$

$$T = \mu N = \mu P \cos\beta$$

$$\frac{F}{P} = \sin\beta \Rightarrow F = P\sin\beta$$

$$F - T = \Delta F$$

$$\Delta F = P\sin\beta - \mu P \cos\beta \Rightarrow \Delta F = P(\sin\beta - \mu\cos\beta)$$

$$\Delta F = ma$$

$$ma = P(\sin\beta - \mu\cos\beta) \Rightarrow a = \frac{P}{m}(\sin\beta - \mu\cos\beta)$$

$$L = \frac{at^2}{2} \Rightarrow t = \sqrt{\frac{2L}{a}} = \sqrt{\frac{2Lm}{P(\sin\beta - \mu\cos\beta)}}$$

EXAMPLE $\mu$=0.002
L=40×10$^{-3}$ m
P=1N
m=8×10$^{-3}$ kg
β=1.5°
⇒ t=0.1624 s

What is claimed is:

1. A slide assembly for mounting on a housing part having a set of converging tracks and provided with means for entering information, said slide assembly being movable along the set of tracks on the housing part between first and second positions, said slide assembly comprising:

a cover part which at least partly covers the means for entering information in the first position of said slide assembly when said slide assembly is mounted on the housing part;

two wings for moving said cover part along the set of converging tracks; and means for biasing said two wings towards each other to urge said two wings toward the convergent end of the converging tracks so as to move said cover part along the tracks to the second position.

2. A slide assembly according to claim 1, wherein said biasing means comprises a spring for urging said two wings together.

3. A slide assembly according to claim 2, wherein one of said wings is fastened to said cover part and the other of said wings is flexibly mounted to said one of said wings and is able to glide inside said cover part and follow the converging set of tracks on the housing part.

4. A slide assembly as claimed in claim 1, wherein said two wings have tracks corresponding to the tracks on the housing part.

5. A slide assembly according to claim 4, wherein one of said wings is fastened to said cover part and the other of said wings is flexibly mounted to said one of said wings and is able to glide inside said cover part, with said tracks on said wings following the converging set of tracks on the housing part.

6. A slide assembly according to claim 5, further comprising bearings in the tracks on the housing part and on said wings each bearing including two guide ways and a set of caged balls between said guide ways.

7. A slide assembly for mounting on a housing part provided with means for entering information, said slide assembly being moveable along a set of tracks on the housing part between first and second positions, said slide assembly comprising:

a cover part which at least partly covers the means for entering information in the first position of said slide assembly when said slide assembly is mounted on the housing part;

a motor for moving said slide assembly along the set of tracks between the first and second positions; and bearings in the tracks on the housing part and in said corresponding tracks on said wings, each bearing including two guide ways and a set of caged balls between said guide ways; and wherein said two wings include tracks corresponding to the tracks on the housing part.

8. A slide assembly for mounting on a housing part provided with means for entering information, said slide assembly being movable along a set of tracks on the housing part between first and second positions, said slide assembly comprising:

a cover part which at least partly covers the means for entering information in the first position of said slide assembly when said slide assembly is mounted on the housing part;

a spring box; and a gearwheel connected to said spring box to move said slide assembly along the set of tracks between the first and second positions; and wherein said spring box is mounted in the housing and is filled with a magneto-rheological fluid; and said slide assembly further comprises two magnets, a first one of said magnets being near said spring box in the closed position of said cover part, and a second one of said magnets being near said spring box in the open position of said cover part.

9. A slide assembly according to claim 8, wherein:

said spring box is mounted on said slide assembly, and said two magnets are mounted on the housing part.

10. A slide assembly according to claim 9, wherein said spring box is formed of polymer composites.

11. A slide assembly for mounting on a housing part provided with means for entering information, said slide assembly being movable along a set of tracks on the housing part between first and second positions, said slide assembly comprising:

a cover part which at least partly covers the means for entering information in the first position of said slide assembly when said slide assembly is mounted on the housing part;

tracks corresponding to the tracks on the housing part; and bearings in the tracks on the housing part and in said corresponding tracks on said slide assembly, for decreasing friction when said slide assembled moves along the tracks between the first and second positions; and wherein each bearing includes two guide ways and a set of caged bills between said guide ways.

12. A communication unit, comprising:

a housing part having a set of converging tracks;

communication means within said housing part and including means for entering information;

a slide assembly moveable along said set of converging tracks on said housing part between first and second positions, said slide assembly including a cover part which at least partly covers said means for entering information in the first position of said slide assembly;

two wings for moving said cover part along said set of converging tracks; and means for biasing said two wings towards each other to urge said two wings toward the convergent end of said converging tracks so as to move said slide assembly along said tracks to the second position.

13. A communication unit, comprising:

a housing part having a set of tracks;

communication means within said housing part and including means for entering information;

a slide assembly movable along said set of tracks on said housing part between first and second positions, said slide assembly including a cover part which at least partly covers said means for entering information in the first position of said slide assembly;

a spring box filled with a magneto-rheological fluid;

a gearwheel connected to said spring box to move said slide assembly along said set of tracks between the first and second positions; and two magnets, a first one of said magnets being near said spring box in the first position of said cover part, and a second one of said magnets being near said spring box in the second position of said cover part.

14. A communication unit, comprising:

a housing part having a set of tracks;

communications means within said housing part and including means for entering information;

a slide assembly moveable along said set of tracks on said housing part between first and second positions, said slide assembly including a cover part which at least partly covers said means for entering information in the first position of said slide assembly, and tracks corresponding to the tracks on said housing part; and bearings in said tracks of said housing part and in said corresponding tracks on said slide assembly, for decreasing friction when said slide assembly moves on said tracks between the first and second positions; and wherein each bearing includes two guide ways and a set of caged balls between said guide ways.

* * * * *